United States Patent Office 2,904,587

Patented Sept. 15, 1959

1

2,904,587

TEREPHTHALIC ACID PROCESS

William K. Johnson and James C. Wygant, Dayton, Ohio, assignors to Monsanto Chemical Company, St. Louis, Mo., a corporation of Delaware No Drawing. Application January 16, 1958
Serial No. 709,211

15 Claims. (Cl. 260—515)

The present invention is directed to a process of preparing terephthalic acid which comprises heating a mixture of benzoic and mono-hydroxybenzoic acid salts. The invention is further directed to the conversion of benzoic acid salts to terephthalic acid salts through use of hydroxyisophthalic acid salts as carboxylating agents. The present invention can also be considered as involving the use of mono-hydroxybenzoic acid salts as carboxyl-forming and carboxyl-donating agents, particularly in the thermal conversion of benzoate salts to terephthalate salts under carbon dioxide pressure; the invention also concerns the foregoing process when mono-hydroxybenzoic acid salts are produced in situ by carbonation of phenates and can further be considered as involving the use of phenates in the thermal conversion of benzoate salts to terephthalate salts under carbon dioxide pressure.

It has been known heretofore that benzoic acid salts are capable of disproportionating in an inert atmosphere under the influence of heat to form terephthalic acid salts and benzene:

$$2C_6H_5CO_2K \xrightarrow[\Delta]{CO_2} KO_2C{-}C_6H_4{-}CO_2K + C_6H_6$$

An undesirable aspect of this reaction is the fact that no more than one-half of the benzoic acid salt can be converted to the desired terephthalic acid salt.

The present invention involves the following reactions:

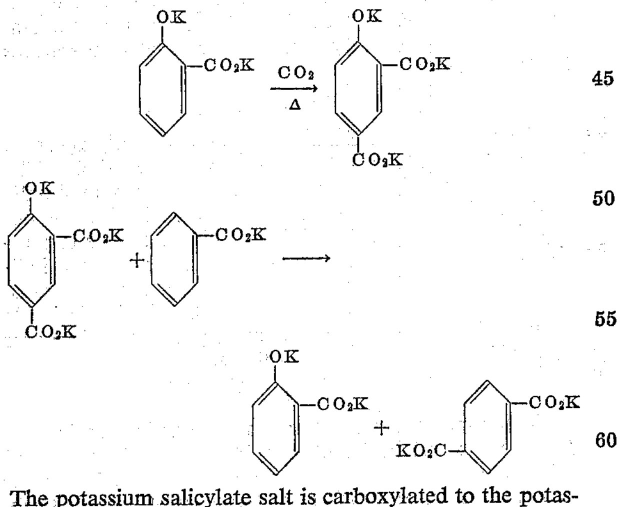

The potassium salicylate salt is carboxylated to the potassium hydroxyisophthalate salt which then serves as carboxylating agent to convert potassium benzoate to potassium terephthalate; the regenerated potassium salicylate is then ready to repeat the process. It will be appreciated that while the potassium salts are used for illustration, other salts, particularly alkali metal salts, can also be used. Moreover, while all of the carboxyl and hydroxyl groups are shown in salt form, as excess base is usually employed in the system, it will be understood that some

2 free carboxyl and hydroxyl groups can be present, depending upon the amount of base in the system. It will also be understood that the para-hydroxybenzoic acid and meta-hydroxybenzoic acid salts can be used in place of the ortho-hydroxybenzoic acid salt. It is evident from the results obtained in the present invention that the reactions occur, at least in part, according to the above equations. However, this does not remove the possibility of other reactions occurring simultaneously to produce terephthalates. Moreover, it will be understood that the production of terephthalates by heating a mixture of benzoates and hydroxybenzoates in the presence of carbon dioxide is contemplated as useful and inventive, regardless of what the mechanism of the reaction may be.

It can be seen from the above equations that the present invention makes possible the conversion of benzoate salts to terephthalate salts in much higher proportions than were obtained by the prior art. As the ultimate carboxylating agent in the present process is carbon dioxide, it will be appreciated that the process will be desirable from an economic viewpoint.

As the benzoate reactant in the present process, salts of benzoic acid itself are preferred, but the benzoate reactant can have various substituents, e.g., methyl-, chloro-, etc., and the use of such salts of benzoic acid containing non-interfering substituents at positions non-para to the carboxyl group to produce the corresponding terephthalic acids is within the contemplation of the present invention.

The proportions of the reactants in the present process can vary considerably. As the hydroxybenzoate is essentially a carboxyl transfer agent, it can be present in from small or catalytic quantities to molar or larger amounts. Proportions in the range of from less than 0.1 mole up to 1 or 2 or more moles of hydroxybenzoate per mole of benzoate can be employed. Very good conversions are obtained with 1 mole hydroxybenzoate per mole of benzoate. However, the use of good agitation in the bulk state, or the use of well-agitated solutions will make very good conversions possible with much smaller molar proportions of hydroxybenzoate, down to 0.1 mole or less, say 0.05 mole for each mole of benzoate.

The present process is ordinarily conducted at elevated temperatures, at least about 300° C. but at temperatures which are not sufficiently high to cause decomposition of the reactants under the reaction conditions, say, for example, from 200° C. to 500° C. Temperatures of the order of about 350° C. to 500° C. are ordinarily suitable, particularly temperatures from 375° C. to 450° C. The reaction is conducted under superatmospheric carbon dioxide pressures, for example, from about 1000 p.s.i. to 5000 p.s.i. or more. There is no upper limit on the amount of pressure to be used, other than a matter of practicality. Pressures in the range of 1500 to 3000 or 4000 p.s.i. are ordinarily preferred. However, lower pressures down to 50 or 100 p.s.i. or the like can be used, although conversions are not as good.

The reaction time should ordinarily be sufficient to cause reaction of substantially all the benzoate salt reactant. The optimum reaction time will vary inversely with the reaction temperature and will also vary to some extent with heat transfer and other conditions of the reaction system. In the reactors described herein, reaction times of about 1 to 20 hours or more are satisfactory, but longer or shorter times can be used. Reaction times of the order of 3 to 15 hours are generally employed. While the reaction can be conducted satisfactorily with no materials other than reactants and catalyst, various other materials can be present as reaction promoters, modifiers, etc., or as heat transfer media or diluents. For example, it would be possible to use sand or the like as a heat transfer medium. When it is desired to agitate the reactants, or to transport the reactants in some type of continuous process, it may be advisable to employ a liquid diluent of some kind, e.g., some insert hydrocarbon such as diphenyl or diphenyl ether or some other material which would not affect the course of the reaction or decompose to any great extent under the reaction conditions to contaminate the product.

The benzoate salts utilized herein can be any benzoate salts capable of thermal carboxylation to terephthalic acid salts. The alkali and alkaline earth metal benzoates are such salts, particularly the alkali metal benzoates, e.g., sodium benzoate, lithium benzoate, potassium benzoate, rubidium benzoate, cesium benzoate and francium benzoate; it is preferred to use salts of alkali metals of atomic weight greater than that of sodium, as the lighter alkali metal salts react less readily and often require higher temperatures or the use of heavy metal catalysts. Alkaline earth salts which are effective are, for example, calcium and magnesium benzoates. It is also possible to employ heavy metal benzoates, e.g., thallium benzoate. In the hydroxybenzoic acid salt component of the reaction mixture, the same metals can be employed as in the benzoate salt reactant. The mono-hydroxybenzoates can be either mono- or divalent salts. The salts of alkali metals heavier than sodium are preferred, for example, dipotassium salicylate, monopotassium salicylate, potassium rubidium salicylate, dirubidium salicylate, dipotassium p-hydroxybenzoate, monopotassium p-hydroxybenzoate, potassium rubidium m-hydroxybenzoate, etc. However, other metal salts can be employed, for example, disodium salicylate, sodium potassium salicylate, etc. It is generally preferred that at least one-half of the cationic portion of the salt reactants in the system be an alkali metal having an atomic weight greater than that of sodium, particularly potassium, rubidium of cesium.

The process of the present invention is preferably conducted in the presence of heavy metal catalyst, although it will take place in the absence of catalyst. The heavy metals can be used, for example, in their metallic, oxide or salt forms. The heavy metals are the group of metals so designated in the periodic chart of the elements (see Lange's Handbook of Chemistry, sixth edition, 1946, pages 58 and 59); for example, aluminum, chromium, titanium, vanadium, manganese, iron, cobalt, nickel, copper, zinc, molybdenum, silver, cadmium, tin, antimony, tungsten, mercury, lead, bismuth, thallium, etc. Any of the heavy metals can be used as free metals or in the form of their salts or oxides. As oxides, mono-, di-, tri-, sesqui-, sub, or whatever oxide forms the metal may exist in are suitable. In the salts, the anions may be from any salt-forming acid so long as the salts which are formed will not unduly interfere in the reaction or contaminate the product. Such common inorganic anions as, for example, $CO_3^-$, $Cl^-$, $F^-$, $Br^-$, $I^-$, $PO_4^{-3}$, etc. form heavy metal salts which will suitably catalyze the conversion to terephthalates. It is also possible to use the heavy metal salts of organic acids, for example, of such acids as acetic acid, propionic acid, benzoic acid, etc. As examples of particular salts which catalyze the reaction very effectively, there are cadmium carbonate, cadmium chloride, zinc carbonate, zinc chloride, lead carbonate, lead chloride, etc. Cadmium compounds, for example, cadmium in the form of its salts, oxides, or in the free metal form are particularly effective in the reaction of the present invention. When the heavy metal catalysts are referred to herein, either generically or individually, it will be understood that the salt and oxide forms are contemplated as well as the free metals.

Any significant amounts of the heavy metal catalysts will be helpful in causing conversion of the benzoate salts to terephthalates. Amounts of the catalysts of from about 1% to 20% by weight, based on the aromatic acid salts, will generally be used; amounts of 2% to 10%, for example, 5%, are very satisfactory.

It is desirable to have an alkaline or basic substance in the reaction mixture to neutralize the carboxyl groups as they are formed. Alkali and alkaline earth carbonates, hydroxides and basic oxides are suitable for this purpose, e.g., potassium carbonate, calcium oxide, sodium hydroxide, etc. If such a material is used, it can conveniently be employed in amounts equimolar with the benzoate salt, although greater or lesser amounts can be used, for example, from less than 1% up to 200% by weight or more. The use of desiccants or drying agents is desirable to take up any water of reaction or neutralization. The value of such materials is particularly notable when low molar portions of the hydroxybenzoate component are employed. Very powerful drying agents are especially valuable in the process, for example, calcium hydride, sodium hydride, calcium carbide, etc. Calcium carbide is especially preferred.

The following examples are illustrative of certain embodiments of the present invention.

*Example 1*

A 300-ml. bomb was provided with a 10-inch stainless steel rack supporting 12 small glass dishes or trays (1 and ¼ inch diameter by ½ inch deep) at equally spaced levels. A charge comprising 0.015 mole potassium benzoate and 0.015 mole dipotassium salicylate as reactants and 5% by weight of the reactants of cadmium carbonate was distributed in five of the dishes, and the bomb was pressured to 850 p.s.i. with carbon dioxide. The bomb was then inserted in a sodium, potassium, lithium nitrate bath which had been heated to 175° C. The temperature was raised to about 400° C. and maintained there for about 12 hours. The bomb was then cooled to 175° C., vented and opened. The reddish-black material in the dishes was boiled up with 50 ml. of water and the mixture was filtered to remove a black, insoluble material. The filtrate was acidified with concentrated hydrochloric acid and the resulting precipitate was boiled up with 50 ml. of water, separated from the water by filtration, and dried to give 2.0 grams of terephthalic acid. This represents a conversion of 80.3% of the benzoate salt reactant to terephthalic acid.

The temperature in the above example was determined by two thermocouples, one located near the top and one near the bottom of the outside of the bomb; it had previously been shown that these thermocouple temperatures corresponded very closely to internal temperatures in the bomb.

*Example 2*

The procedure of Example 1 was essentially repeated except that the reaction temperature was 350° C. The conversion of the potassium benzoate to terephthalic acid was 38.5%. As potassium benzoate by itself is not readily converted to terephthalic acid at such comparatively low temperatures, this substantial conversion indicates that potassium salicylate serves as a carboxyl transfer agent even at 350° C. It will ordinarily be desirable to use higher reaction temperatures, however, in order to avoid overly-long reaction times.

*Example 3*

Potassium benzoate, 0.025 mole, potassium carbonate, 0.025 mole, dipotassium salicylate, 0.00625 mole, and 0.3 gram of cadmium carbonate were ground together and the resulting mixture was distributed alternatively with calcium carbide in the dishes in the bomb of Example 1. The calcium carbide in the alternate dishes was to serve as a drying agent. The bomb was pressurized to 775 p.s.i. with carbon dioxide and heated to 400° C. (1900 p.s.i.) for 12 hours. The material in the reactant dishes, which was very black, was boiled up with 75 ml. of water, treated with charcoal and filter-aid (Celite, a diatomaceous earth) and filtered. The black filtrate was treated with concentrated hydrochloric acid and the resulting precipitate was collected and boiled up with 75 ml. of water. Filtration and drying gave 3.0 grams of terephthalic acid for a 72.3% conversion. Thus, it can be seen that the presence of a 25% molar portion of dipotassium salicylate makes it possible to convert more than 70% of a benzoate reactant to terephthalic acid. The terephthalic acid was identified by neutral equivalent and infrared analysis. It is evident that some of the carboxyl groups in the product came from carbon dioxide, as the benzoate and salicylate reactants in this example could provide only enough carboxyl groups for a maximum conversion of 62.5% of the benzoate reactant.

*Example 4*

A reaction was conducted according to the procedure of Example 3, but with only one molar part dipotassium salicylate for 10 molar parts potassium benzoate. An admixture of potassium benzoate, 0.025 mole, potassium carbonate, 0.025 mole, dipotassium salicylate, 0.0025 mole, and 0.4 gram cadmium carbonate was charged to the bomb along with lump calcium carbide which was placed in separate dishes. The bomb was heated at 400° C. and a maximum carbon dioxide pressure of 2400 p.s.i. for 12 hours. The product was treated according to the procedure of Example 1 to give 2.05 grams terephthalic acid for a 49.4% yield.

*Example 5*

A 300-ml. rocking autoclave was charged with 0.025 mole (4.0 grams) potassium benzoate, 0.025 mole (5.4 grams) dipotassium salicylate, 3.5 grams potassium carbonate, 0.7 gram cadmium carbonate, 5 grams calcium carbide, and 100 ml. of a liquid diluent—a mixture of diphenyl and diphenyl ether (Dowtherm A). The bomb was closed, flushed twice with carbon dioxide, and pressured at 900 p.s.i. After rocking was commenced, the pressure fell to 550 p.s.i. The temperature was raised to 375° C. (about 1100 p.s.i.) and maintained there for about 12 hours. After the bomb cooled to room temperature, it had 210 p.s.i. The material was rinsed from the bomb with 100 ml. benzene and the insoluble material was removed by filtration and dissolved in 75 ml. water. The aqueous solution was filtered and acidified, and the resulting precipitate was boiled up with water, separated by filtration and dried to give 2.5 grams of terephthalic acid for a yield of 60.2%.

*Example 6*

A mixture of 0.025 mole potassium benzoate, 0.025 mole dipotassium p-hydroxybenzoate, 0.025 mole potassium carbonate, 5% by weight of the benzoate reactants of cadmium carbonate, 5 grams cadmium carbide and 100 ml. Dowtherm A was charged to a rocking autoclave and heated at 375° C. at about 2400 p.s.i. of carbon dioxide for 12 hours. The bomb was cooled to 50° C. (725 p.s.i.), vented and opened. The contents were worked up as in Example 5 to give 2.8 grams of terephthalic acid for a yield of 67.5%.

*Example 7*

The following procedure illustrates the conversion of dipotassium salicylate to 4-hydroxyisophthalic acid by means of heat and carbon dioxide pressure. A 21.4 gram (0.1 mole) charge of dipotassium salicylate was placed in a bomb and heated at 350° C. under 2100 p.s.i. of carbon dioxide for 6 hours. The bomb was opened and the product was dissolved in 100 ml. of warm water, treated with charcoal and filtered. The filtrate was acidified with concentrated hydrochloric acid and the resulting precipitate was collected, washed with cold water and dried to give 15.3 grams of product. The product was recrystallized from hot water and gave a positive ferric chloride test for free hydroxyl. The neutralization equivalent indicated the presence of less than two acid groups, but an ignition test which left a slightly basic residue indicated present of a salt group; it was concluded that the acid had been obtained in the form of its half-acid salt, monopotassium 4-hydroxyisophthalic acid; the free acid was obtained by recrystallizing from dilute hydrochloric acid solution. The acid sublimed at 290° and melted at 305–306° C.; the melting point when admixed with 4-hydroxyisophthalic acid (M.P. 303–307° C.) obtained by oxidation of 2,4-dimethylphenol (with KOH and $PbO_2$, followed by acidification) was 306–310° C. The results of this example demonstrate that salts of 4-hydroxyisophthalic acid are intermediates in the present process for preparing terephthalic acid.

While the main reaction in the process of the present invention goes through 4-hydroxyisophthalic acid, it is possible that the salicylate salt itself serves to some extent as a carboxylating agent for the benzoate salt, being itself converted to a phenol or phenolate which is then carboxylated by carbon dioxide to regenerate the salicylate. It is also probable that other hydroxyphthalic acids serve as intermediates in the process. For example, use of m-hydroxybenzoate salts in the process would result in production of 2-hydroxyterephthalic acid which could then carboxylate the benzoate salt reactant.

The following example demonstrates that phenolates are carboxylated under the reaction conditions and improve the conversion of the benzoates.

*Example 8*

A mixture of 0.025 mole potassium benzoate, 0.025 mole potassium phenate, 0.05 mole potassium carbonate, and 5% by weight of cadmium carbonate was distributed alternatively with lump calcium carbide in the dishes in the bomb of Example 1. The bomb was pressured to 900 p.s.i. carbon dioxide and heated to 400° C. The bomb was kept at 400° C. for twelve hours. The product was worked up according to the procedure of Example 1 to give 2.8 grams of terephthalic acid, for a conversion of 67.5% of the benzoate. It is apparent that potassium phenate and its carbonation products improve the thermal conversion under carbon dioxide of benzoate salts to terephthalate salts. However, even though the phenate is useful and effective in this respect, it is better to add the hydroxy benzoate salts as such because of the superior results attained thereby.

For acidifying the terephthalate salts to terephthalic acid, any acid is suitable so long as it is a stronger acid than terephthalic acid or is capable of replacing the terephthalic acid from its salt under the acidification conditions, and so long as it does not react with or lead to undesirable contamination of the terephthalic acid product. Suitable acids are, for example, mineral acids such as nitric acid, hydrochloric acid, phosphoric acid, sulfuric acid, etc., or organic acids, e.g., formic acid, acetic acid, and benzoic acid; or carbonic acid.

We claim:

1. The process of preparing terephthalic acid salts which comprises heating a mixture of mono-hydroxybenzoic acid salts and benzoic acid salts, each of said salts being selected from the group consisting of the alkali and alkaline earth metal salts of said acids, under carbon dioxide pressure to temperatures of at least about 300° C., but not sufficiently high to cause substantial degradation of the hydrocarbon structure in the reactants.

2. The method of claim 1 in which the reaction is conducted in the presence of a heavy metal containing catalyst.

3. The method of preparing terephthalate salts which comprises heating potassium benzoate and potassium salts of monohydroxybenzoic acids under carbon dioxide pressure at temperatures of 350 to 500° C.

4. The method of preparing terephthalic acid which comprises heating potassium benzoate and dipotassium salicylate at about 350° C. to about 450° C. under carbon dioxide pressures of about 1500 to about 4000 p.s.i., and acidifying the resulting product.

5. The preparation of terephthalates which comprises heating benzoic acid salts with 4-hydroxyisophthalic acid salts at temperatures of 350° C. to 500° C., each of said salts being selected from the group consisting of the alkali and alkaline earth metal salts of said acids.

6. The method of preparing terephthalate salts which comprises heating a mixture of hydroxybenzoate and benzoate salts of alkali metals at temperatures of 350° to 500° C.

7. The method of claim 6 in which the alkali metals have an atomic weight greater than that of sodium.

8. The method of claim 6 in which the hydroxybenzoate salt is dipotassium salicylate.

9. The method of claim 6 in which the hydroxybenzoate salt is dipotassium p-hydroxybenzoate.

10. The method of preparing terephthalic acid which comprises heating a mixture of the potassium salts of salicylic acid and benzoic acid in proportions of about 0.1 to 2 moles of salicylic acid salt for 1 mole of benzoic acid salt, in the presence of a heavy metal catalyst and an alkali carbonate at pressures of 1000 to 5000 p.s.i. of carbon dioxide and at temperatures of about 375° to about 450° C.

11. The method of claim 10 in which a drying agent selected from the group consisting of calcium carbide and calcium hydride is also present.

12. The method of claim 10 in which the heavy metal is cadmium.

13. The method of preparing terephthalate salts which comprises heating a mixture of alkali metal phenate and alkali metal benzoate under carbon dioxide pressure at temperature of 350° C. to 500° C.

14. The method of preparing terephthalate salts which comprises heating alkali metal benzoate and alkali metal salicylate under carbon dioxide pressure at temperatures of about 350° C. to 500° C., in which the alkali metal salicylate is formed in situ from alkali phenate and carbon dioxide.

15. The method of preparing terephthalate salts which comprises heating alkali metal benzoates under carbon dioxide pressure in the presence of carbonation products of alkali metal phenates at temperatures above about 350° C. but not sufficiently high to cause substantial degradation of the hydrocarbon structure in the reactants.

No references cited.